United States Patent [19]
Akiyama et al.

[11] Patent Number: 6,046,629
[45] Date of Patent: Apr. 4, 2000

[54] METHOD OF AN APPARATUS FOR DEMODULATING AMPLITUDE-MODULATED SIGNALS IN AN AMPLITUDE PHASE SHIFT KEYING (APSK) SYSTEM

[75] Inventors: Toshiyuki Akiyama; Atsushi Miyashita, both of Tokorozawa; Seiichi Sano, Higashiyamato; Nobuo Tsukamoto, Akishima; Shigeki Moriyama; Kenichi Tsuchida, both of Tokyo, all of Japan

[73] Assignee: Hitachi, Ltd., Tokyo, Japan

[21] Appl. No.: 09/096,455

[22] Filed: Jun. 11, 1998

[30] Foreign Application Priority Data

Jun. 12, 1997 [JP] Japan .................................. 9-155398
Jun. 12, 1997 [JP] Japan .................................. 9-155399

[51] Int. Cl.$^7$ .................................................. H03D 3/00
[52] U.S. Cl. ........................... 329/304; 329/317; 375/324
[58] Field of Search .................................. 329/304, 305, 329/306, 307, 308, 309, 310, 317; 375/320, 324

[56] References Cited

U.S. PATENT DOCUMENTS

| | | | |
|---|---|---|---|
| 4,484,154 | 11/1984 | Pavin | 331/23 |
| 5,023,948 | 6/1991 | Smith | 455/616 |
| 5,162,937 | 11/1992 | Heidemann et al. | 359/124 |
| 5,363,849 | 11/1994 | Suorsa et al. | 128/661.08 |

*Primary Examiner*—Benny Lee
*Assistant Examiner*—Henry Choe
*Attorney, Agent, or Firm*—Antonelli, Terry, Stout & Kraus, LLP

[57] ABSTRACT

In a demodulating method of demodulating amplitude-demodulated signals in an amplitude phase shift keying system for conducting an amplitude modulation by setting signal points as information codes on a complex plane representing a signal space of transmission signals onto circumferences of two concentric circles including a first circle having a first diameter and a second circle having a second diameter smaller than the first diameter on the complex plane, there are obtained, in accordance with an amplitude value of an amplitude component of each symbol of a received amplitude-modulated signal, a first threshold value and a second threshold value having a predetermined relationship with the amplitude value. Next, the amplitude value the an amplitude component of each symbol of the successively received amplitude-modulated signal is compared with the first and second first threshold values to determine an amplitude variation in the amplitude component of each symbol in accordance with a result from the comparison so as to output therefrom a signal representing the determination result as a code obtained by demodulating the amplitude component.

25 Claims, 10 Drawing Sheets

METHOD OF AN APPARATUS FOR DEMODULATING AMPLITUDE-MODULATED SIGNALS IN AN AMPLITUDE PHASE SHIFT KEYING (APSK) SYSTEM

BACKGROUND OF THE INVENTION

The present invention relates to a method of and an apparatus for demodulating codes or signals transmitted in terms of amplitude components from a transmitting device in an APSK system for conducting an amplitude modulation by setting signal points as information codes on a complex plane representing a signal space of transmission signals onto two concentric circumference with mutually different radii in the complex plane.

Recently, to improve the transmission rate in digital radio communication systems using mobile facilities and terrestrial communication devices, there has been increasingly discussed an amplitude phase shift keying system in which information codes to be transmitted are modulated also in the amplitude direction.

In the APSK system, various methods of allocating signal points have conventionally been known in consideration of an aspect of the power utilization efficiency and the code error rate. For example, there has been known a 16 quadrature amplitude modulation (QAM) system as described in page 30 of the "Digital Radio Communication" written by Masayoshi Muroya and Heiichi Yamamoto and published from Sangyo Tosho Inc. (1985).

In this case, the transmission signal can be generally expressed by points on the complex plane as the signal space or by complex vectors represented by the points.

Under this condition, 'Decision Feedback Differential Detection of Differentially Encoded 16APSK Signals' of "IEEE Transactions on Communications, Voll. 44, No. 4, Apr. 1996" has proposed an example of the method of allocating signal points in which signal points are set onto two different circumferences on the complex plane.

FIG. 1 shows an example of setting signal points in the method. As can be seen from this diagram, eight points are placed on an outer larger circumference with diameter D1 and eight points are set onto an inner smaller circumference with diameter D0. Namely, a total of 16 signal points are allocated. The allocation of signal points is an example of the signal point allocation in the 16APSK system in which a hexadecimal value is represented in association with transmission of one of the signals on the 16 signal points.

In the following description, a period in which a signal of the selected signals point is transmitted is referred to as one symbol.

In relation to a general transmission system of the 16APSK system, FIG. 2 shows an example of a modulating section employed on a transmission side and FIG. 3 shows an example of a demodulating section employed on a reception side.

On the transmission side of FIG. 2, digital information codes to be transmitted are supplied to a dividing circuit 1 to be divided into 4-bit codes.

The 4-bit code includes one bit to be fed to an amplitude delay circuit 2 as a code to be transmitted as an amplitude component, and three remaining bits are fed to a phase delay circuit 3 as a code to be transmitted as a phase component.

First, the received code or signal is processed in the circuit 2 as follows.

Incidentally, one of the binary value is expressed as "L (low level: 0)" and the other as "H (high level: 1)" in the following description.

Assume now that code value A(m) of the m-th symbol transmitted as an amplitude component, e.g., code value A(4) shown in FIG. 4A is "H". There is produced code B(4) of FIG. 4B by inverting the code value of the preceding symbol, the (m−1)-th symbol, that is, code value B(3) of the third symbol.

Subsequently, assuming similarly that code value A(m) transmitted, e.g., code value A(4) shown in FIG. 4A is "L", there is produced code B(6) having a value equal to that of code B(5) transmitted as the (m−1)-th symbol, namely, the fifth symbol.

In this case, the circuit 3 conducts processing which is ordinarily executed by a digital transmitting facility in the differential detection system. However, this is not directly related to the present invention and hence will not be described.

Next, a modulating circuit 4 allocates a 4-bit code including a 1-bit code from the circuit 2 and a 3-bit code from the circuit 3 to one of the signal points shown in FIG. 1 to produce a modulated signal of a carrier corresponding to the allocated point so as to transmit the signal via an up converter 5.

In more detail, the circuit 4 allocates a signal point on the circumference of the large circle with radius D1 when the code from the circuit 2 is "1" and a signal point on the circumference of the small circle with radius D0 when the code from the circuit 2 is "0" to generate modulated signals of carriers respectively corresponding to the allocated signal points.

On the other hand, a signal received on a receiving side of FIG. 3 via a down converter 8 is delivered to an amplitude code or signal demodulating circuit 9 and a phase detecting circuit 10 to separately demodulate the amplitude and phase components.

Thereafter, the demodulated signals are again coupled or mixed with each other into a digital information code to be outputted therefrom.

In the operation, the processing executed by the circuit 10 is the processing ordinarily conducted by the digital transmitting facility in the differential detection system as in the case of the phase delay circuit 3. This is hence not directly related to the present invention and will not be described. The processing of the circuit 9 closely related to the present invention will be described in more detail.

The signal inputted to the circuit 9 can be expressed by a complex vector $Z(m)$ on the complex plane of FIG. 1 in which an absolute value $R(m)$ of the vector $Z(m)$ indicates an amplitude of the received signal.

In this situation, to standardize the terminology with respect to the description of the modulator circuit 4 on the transmission side, the absolute value $R(m)$ is represented as the amplitude value $R(m)$.

FIG. 5 shows an example of a conventional amplitude code demodulating circuit 9. In FIG. 5, an amplitude component separating circuit 12 is a circuit which receives a signal from the down converter 8 via an analog-to-digital (A/D) converter, not shown, and then calculates an amplitude value $R(m)$ of the received signal. The value $R(m)$ from the circuit 12 is directly sent to an amplitude ratio obtaining circuit 14 on one hand. On the other hand, the value $R(m)$ is fed via a delay circuit 13 having a delay of a one-symbol period to the circuit 14. In the circuit 14, a current or present amplitude value $R(m)$ is compared with an amplitude value $R(m-1)$ of the symbol older than the current symbol by one symbol period to thereby obtain an amplitude ratio as $H(m)=R(m)/R(m-1)$.

The ratio H(m) has a waveform shown in FIG. 4C.

The obtained ratio H(m) is then fed to an amplitude ratio determining circuit 17 to be compared with predetermined first and second threshold values Hth1=(1+D0 /D1)/2 and Hth2=(1+D1/D2)/2.

First, when there are obtained conditions Hth1≦H(m) and H(m)<Hth2, the amplitude is assumed not to have varied so as to produce a code of "L". On the other hand, when conditions Hth1>H(m) and H(m)>Hth2 result, the amplitude is assumed to have varied so as to produce a code of "H".

The waveform of the code A(m)' of the output signal is then as shown in FIG. 4D. As can be seen from this graph, this waveform is substantially equal to that of the signal of code value A(m) transmitted by the m-th symbol as an amplitude component as shown in FIG. 4A.

Consequently, in accordance with the prior art, of the codes transmitted from the circuit 17, those transmitted as amplitude components are demodulated into output signals. Resultantly, there is obtained a function of a demodulating section of the 16APSK system.

Incidentally, as described above, the amplitude code demodulating circuit 9 of the conventional technology requires the amplitude ratio obtaining circuit 14 to execute a dividing operation of H(m)=R(m)/R(m−1) to attain the amplitude ratio. Therefore, in general, the configuration ordinarily includes a digital circuit including an address circuit 15 and a memory, e.g., a read-only memory (ROM) 16 as shown in FIG. 5.

For the ROM 16, there may be incidentally used an ROM table. The address circuit 15 includes, for example, flip flop circuits 15a and 15b respectively receiving amplitude values R(m) and R(m−1) respectively from the circuits 12 and 13 and a latch circuit 15c to latch data 16c read from the ROM 16. The values R(m) and R(m−1) respectively from the circuits 12 and 13 are used as addresses 16a and 16b to access the ROM 16 to obtain the amplitude ratio R(m)/R(m−1) therefrom. Namely, there are beforehand stored the amplitude ratios corresponding to all combinations of the amplitude values R(m) and R(m−1) in the ROM 16. The ratio 16c (H(m)) thus read from the memory is stored in the latch circuit 15c to be outputted therefrom to the amplitude ratio determining circuit 17.

In this connection, the amplitude of the received signal successively varies in accordance with a level of reception. Moreover, when the codes or signals are transmitted by using also the amplitude component as shown in the signal allocation diagram of FIG. 1, the level comparison is required to be exactly conducted also for the amplitude level.

Therefore, when the number of bits is small in the analog-to-digital signal conversion by the A/D converter in the configuration, the level resolution becomes coarse and there appears a large rounding error, which easily results in a code error in the demodulated code.

In consequence, at least eight bits are required for the digital signal undergone the A/D conversion. If possible, ten or more bits are desirable.

However, for example, even when eight bits are assigned to the digital signal, the dividing operation using the ROM 16 requires that the address is specified by a total of 16 bits including eight bits indicating the amplitude value R(m) and eight bits indicating the amplitude value R(m−1) to read the value of the quotient stored at the specified address. As a result, in the prior art, even when the necessary minimum value of bits, i.e., eight bits are assigned to the signal, there is adopted an ROM having a storage capacity of 256 bytes×256 bytes=65,536 bytes≈66 kilobytes.

SUMMARY OF THE INVENTION

In accordance with the prior art, attention has not been given to a point of necessity of an ROM having a large memory capacity, which results in a problem of a considerable increase in cost.

On the other hand, when the circuit configuration is implemented with an ROM having a small memory capacity, there arises a problem that the circuit size is increased.

Additionally, a ROM with a large memory capacity ordinarily has a low operation speed. Consequently, when it is desired to increase the transmission rate in terms of the number of transmission bits per second, there occurs a problem that the system cannot cope with the desired operation.

In addition, consideration has not been given to the increase in noise which appears in association with the principle of constitution. This results in a problem of difficulty in the suppression of the increasing cost and code error rate.

That is, in the prior art, the noise is inevitably increased for the following reasons and hence the code error rate cannot be lowered.

In other words, the amplitude value R(m) of the received signal inevitably includes noise in general cases, which determines the value of signal-to-noise (S/N) ratio of the input signal.

On the other hand, the calculation of the amplitude ration H(m) used in the prior art to demodulate the code transmitted as an amplitude component is a division of R(m)/R(m−1). In this case, the noise level of the ratio H(m) resultant from the calculation is as well known about 3 decibels (dB) increased in principle when compared with that of the amplitude value R(m).

However, since the code is demodulated in accordance with the ratio H(m) with the increased noise in the conventional technology, the S/N ratio is deteriorated and the code error ratio of the demodulated codes is increased.

It is a primary object of the present invention to provide a method of and an apparatus for demodulating amplitude-modulated signals of the APSK system in which the amplitude-modulated component of transmitted signals can be demodulated without requiring a high-speed ROM having a large memory capacity.

Another object of the present invention to provide a method of and an apparatus for demodulating amplitude-modulated signals of the APSK system capable of easily demodulating codes with a low code error rate without requiring a high-speed ROM having a large memory capacity.

The primary object above can be achieved as follows in a method of demodulating amplitude-modulated signals in an APSK system by setting signal points on a complex plane representing a signal space of transmission signals onto two concentric circumferences with mutually different radii. Namely, for the amplitude value of the amplitude-modulated signal of each received symbol, there are set a first threshold value and a second threshold value in accordance with a predetermined relationship with the amplitude value. The successively varying amplitude value of the received amplitude-modulated signals is compared with the first and second threshold values to thereby determine the change in the amplitude value of the signal of each symbol in accordance with the result of comparison.

In accordance with an aspect of the present invention, there is provided a demodulating apparatus for demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter on the complex plane. The apparatus comprises an amplitude code demodulating circuit for demodulating an amplitude component $R(m)$ of each symbol of the amplitude-modulated signal. The demodulating circuit includes a threshold value obtaining circuit for obtaining a first threshold value $TH1(m)=R(m-1)\times Dth/D1$ and a second threshold value $TH2(m)=R(m-1) \times Dth/D0$ in accordance with an amplitude value $R(m-1)$ of an $(m-1)$-th symbol received one symbol in advance of an m-th symbol of the amplitude-modulated signal currently being received from the down converter, where D1 indicates a radius of the first circle, D0 denotes a radius of the second circle, Dth stands for a constant between the radii D1 and D0, and an amplitude variation determining circuit for comparing an amplitude value $R(m)$ of the m-th symbol of the amplitude-modulated signal currently being received from the down converter respectively with the first and second first threshold values $TH1(m)$ and $TH2(m)$, producing one of the binary values when the value $R(m)$ is in a range between the values $TH1(m)$ and $TH2(m)$, producing the other one thereof when the value $R(m)$ is beyond the range, and outputting the binary value as a code obtained by demodulating the amplitude component of the m-th symbol.

That is, in the prior art, there is attained a ratio $R(m)/R(m-1)$ between the amplitude value $R(m)$ of the m-th symbol and the amplitude value $R(m-1)$ of the $(m-1)$-th symbol and then the ratio is compared with the first and second threshold values $Hth1=(1+D0/D1)/2$ and $Hth2=(1+D1/D0)/2$ to obtain a demodulated code, and hence a divider is required to attain the amplitude ratio. Furthermore, when the amplitude ratios are beforehand obtained to be stored in a memory, the memory capacity is considerably increased due to variables $R(m)$ and $R(m-1)$ for the amplitude ratios. However, in accordance with the present invention, the amplitude value $R(m-1)$ of the $(m-1)$-th symbol is compared with the first and second threshold values $TH1(m)=R(m-1)\times Dth/D1$ and $TH2(m)=R(m-1)\times Dth/D0$ to obtain a demodulated code, which can be conducted without any divider. Moreover, when the first and second threshold values $TH1(m)$ and $TH2(m)$ are attained in advance to be stored in a memory, the storage capacity of the memory is decreased because of only one variable $R(m-1)$ for the threshold values.

Resultantly, since the demodulation of the amplitude-modulated signal can be achieved with any divider circuit in accordance with the present invention, the storage capacity of the memory (ROM) required for the threshold value calculation is remarkably decreased to $1/128$ or more when compared with the conventional system and hence the circuit size can be minimized.

Additionally, since the necessity of the expensive ROM is removed, the price of the demodulator can be decreased.

Furthermore, since the necessity of the high-speed ROM is removed, there can be obtained a demodulator having a higher transmission rate when compared with the conventional demodulator.

To solve the second object according to the present invention, there is provided an amplitude code demodulating circuit for use in a demodulating apparatus for demodulating amplitude-demodulated signals in an amplitude phase shift keying system for conducting an amplitude modulation by setting signal points as information codes on a complex plane representing a signal space of transmission signals onto circumferences of two concentric circles including a first circle having a first diameter and a second circle having a second diameter smaller than the first diameter. The amplitude code demodulating circuit includes an amplitude code determining circuit for comparing an amplitude value $R(m)$ of the m-th symbol of the amplitude-modulated signal received from the down converter respectively with a coherent threshold value $TH(m)$ for the m-th symbol from a coherent threshold value delay circuit, determining a variation in the amplitude value of the amplitude component of the m-th symbol in accordance with a result from the comparison, and outputting a signal indicating the comparison result as an amplitude code obtained by demodulating the amplitude component of the m-th symbol, a current symbol threshold value obtaining circuit for obtaining, in accordance with the amplitude value of the amplitude component of the m-th symbol of the amplitude-modulated signal from the down converter and the amplitude code of the m-th symbol from the amplitude code determining circuit, a first threshold value or a second threshold value having a predetermined relationship with the amplitude value and the amplitude code, and a coherent threshold value obtaining circuit for attaining a coherent threshold value $TH(m+1)$ for the $(m+1)$-th symbol in accordance with the coherent threshold value $TH(m)$ for the m-th symbol from the coherent threshold value delay circuit and the first or second threshold value from the current symbol threshold value obtaining circuit. The coherent threshold value delay circuit delays one symbol the coherent threshold value $TH(m+1)$ for the $(m+1)$-th symbol from the coherent threshold value obtaining circuit to thereby input the coherent threshold value $TH(m+1)$ to the amplitude code determining circuit when the $(m+1)$-th symbol is inputted to the amplitude code determining circuit.

In other words, the amplitude code can be demodulated without using the divider circuit and hence the memory capacity of the memory (ROM) can be considerably decreased to $1/128$ or more when compared with the conventional system and hence the circuit size can be minimized.

Additionally, since the necessity of the expensive ROM having a large storage capacity is removed, the price of the transmitting facility can be decreased.

Moreover, since there is calculated the coherent threshold value $TH(m)$ having an S/N ratio larger than that of the received signal to demodulate the amplitude code in accordance with the value $TH(m)$, the performance of the receiving facility can be improved about 3 dB.

Resultantly, a code having an error rate substantially equal to that of the code attained in the prior art can be produced even in a state in which the noise included in the received signal is increased about 3 dB.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
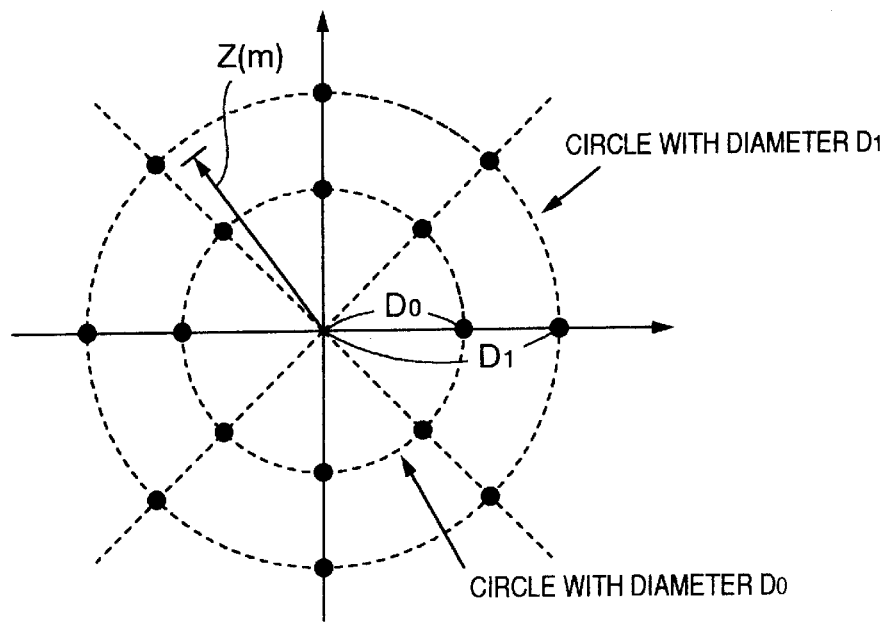
FIG. 1 is a diagram showing an example of allocation of signal points on a complex plane in the 16APSK system.

Referring now to the accompanying drawings, description will be given in detail of the respective embodiments of the method of and the apparatus for demodulating amplitude-modulated signals in the APSK system in accordance with the present invention. In this connection, the same constituent components are assigned with the same reference numerals in the drawings and description thereof will not be duplicated in the description.

First, referring to FIG. 6 and associated diagrams, description will be given of an amplitude-modulated signal demodulating section on the reception side of a first embodiment in accordance with the present invention. This embody provides an amplitude-modulated signal demodulating section which functions without using a high-speed ROM having a large capacity. In this embodiment, the overall configuration of a transmission-side modulating section (modulator) and a reception-side demodulating section (demodulator) in a transmitting facility of the APSK system are substantially the same as those of the prior art shown in FIGS. 2 and 3. The configuration varies from that of the conventional technology in that the amplitude code demodulating circuit of the reception-side demodulating section of the embodiment varies in constitution and operation from the amplitude code demodulating circuit 9 shown in FIG. 3. Therefore, the different points of the that the amplitude code demodulating circuit of the reception-side demodulating section with respect to the prior art will be primarily explained in the following description.

Figure 5:
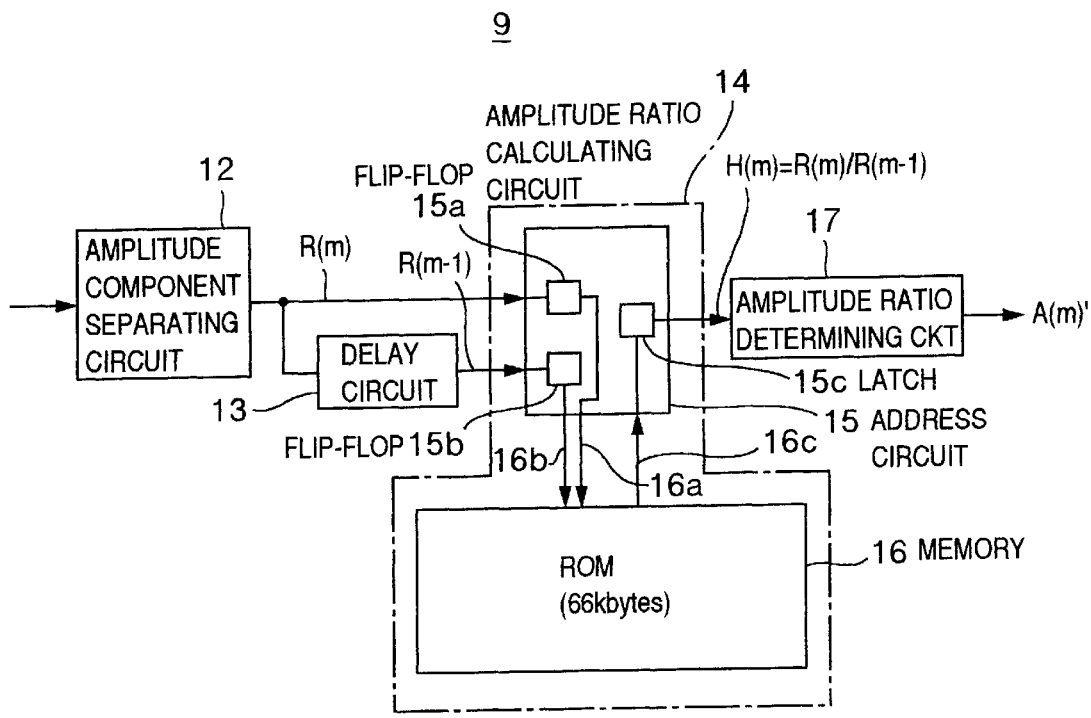
FIG. 5 is a block diagram showing a conventional example of the an amplitude code demodulating circuit of FIG. 3.
Figure 6:
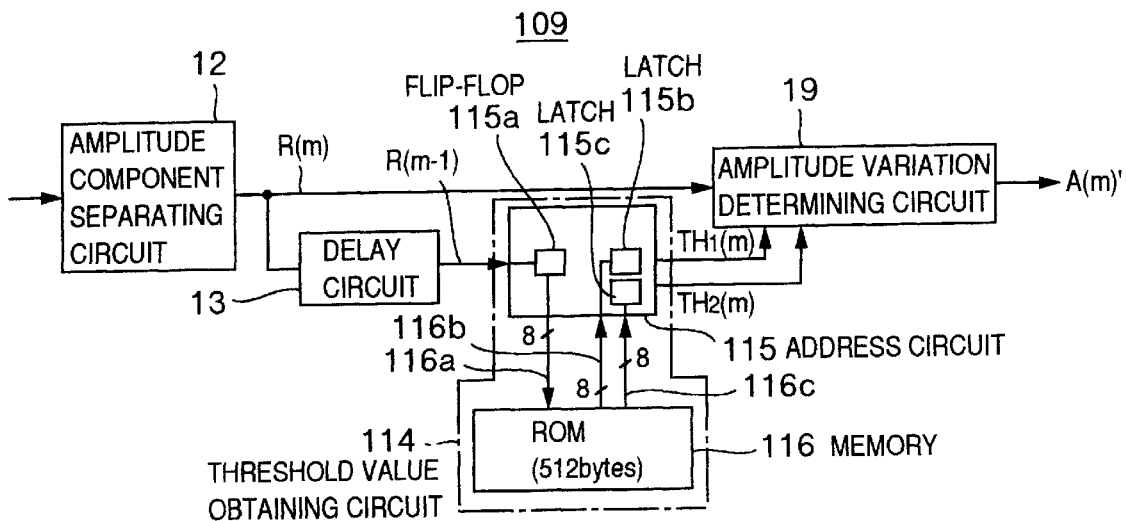
FIG. 6 is a block diagram showing a construction example of an amplitude code demodulating circuit in an amplitude-modulated signal demodulating section on the reception side in an embodiment in accordance with the present invention.

FIG. 6 shows in a block diagram an example of constitution of an amplitude code demodulating circuit 109 in an amplitude-modulated signal demodulating section on the receiving side of the first embodiment in accordance with the present invention. Also in the circuit 109 of FIG. 6, the received signal is fed via an A/D converter, not shown, to an amplitude component separating circuit 12 to calculate an amplitude value R(m) of the signal. In the configuration, the obtained value R(m) is then fed to a delay circuit 13 to produce an amplitude value R(m−1) with a delay period of one symbol. These points are substantially identical to those of the conventional example of FIG. 5.

However, the embodiment of FIG. 6 varies from the conventional example of FIG. 5 in the following points. That is, the output R(m) from the circuit 12 is not supplied to an amplitude ratio obtaining circuit (FIG. 5) but is fed to an amplitude variation determining circuit 19 in the embodiment of FIG. 6. On the other hand, the output from the circuit 12 which is supplied via the delay circuit 13, i.e., the output R(m−1) is fed to a threshold value obtaining circuit 114.

First, beforehand set to the circuit 114 are a constant value Dth, which will be described later, and two kinds of coefficient values Dth/D1 and Dth/D0 determined by the values of radii D1 and D0 respectively of the large and small circles shown in FIG. 1 in relation to the signal point allocation.

In this case, the value Dth is set to a value between those of radii D1 and D0, for example, substantially a mean value thereof $$Dth \approx (D1+D0)/2.$$

When a probability distribution of noise is taken into consideration, the optimal value of the constant value Dth is slightly different from the mean value. However, for simplification of explanation, the setting value above will be used in the description.

The circuit 114 includes an address circuit 115 and a memory such as an ROM (e.g., an ROM table) 116. In the ROM, there are beforehand stored first and second threshold values TH1(m) and TH2(m) obtained from the following expressions in accordance with the one-symbol delayed amplitude value R(m−1) from the delay circuit 13. Namely, for all values of R(m−1), the first and second threshold values TH1(m) and TH2(m) are attained to be stored therein.

$$TH1(m)=R(m-1)\times(Dth/D1)$$

$$TH2(m)=R(m-1)\times(Dth/D0)$$

The address circuit 115 includes a flip-flop circuit 115*a* to receive the value R(m−1) from the circuit 13 and latch circuits 115*b* and 115*c* to respectively latch data 16*b* (first threshold value TH1(m)) and data 16*c* (second threshold value TH2(m)) read from the ROM 116. The address circuit 115 accesses the ROM 116 with an address 116*a* represented by the value R(m−1) from the flip-flop 115*a* to read therefrom the first threshold value TH1(m) and the second threshold value TH2(m). The obtained values are respectively latched by the latch circuits 115*b* and 115*c* to be fed to an amplitude variation determining circuit 19. In the circuit 19, the value R(m) obtained from the circuit 12 is compared with the first and second threshold values TH1(m) and TH2(m) from the circuit 114 so as to produce a code "L" (low level: "0") or a code "H" (high level: "1") as follows.

Figure 7A:
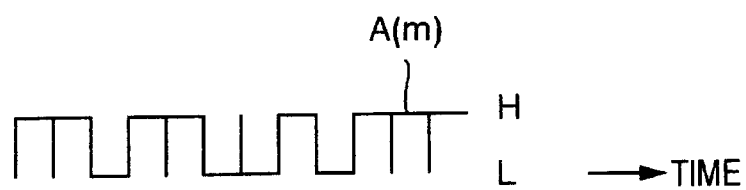
FIG. 7A is a timing chart for explaining amplitude modulation of an input signal on the transmission side.
Figure 7B:
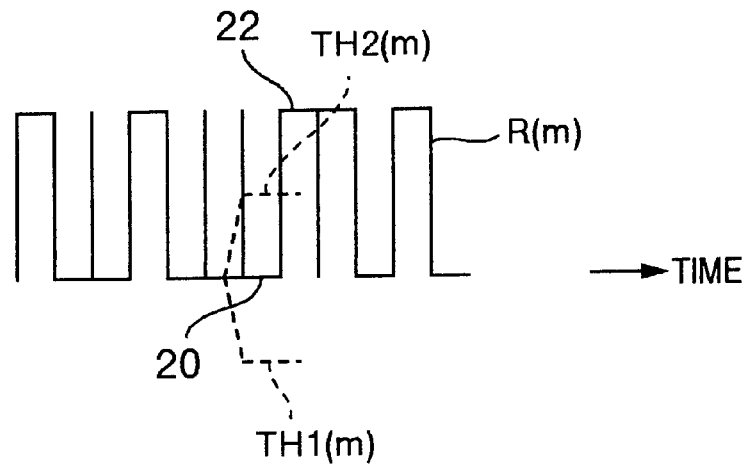
FIG. 7B is a timing chart for explaining amplitude demodulation of an input signal of the amplitude code demodulating circuit in the embodiment of FIG. 6.
Figure 7C:
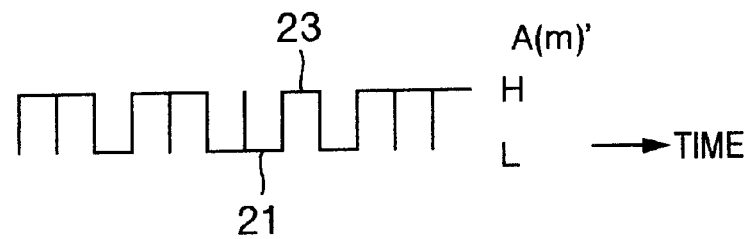
FIG. 7C is a timing chart of an output waveform from of the amplitude code demodulating circuit of FIG. 6.

That is, when the amplitude value R(m) of the m-th symbol of the current received signal is within a range determined by first and second threshold values TH1(m) and TH2(m) as indicated by a reference numeral 21 in FIG. 7B, there is produced the code "L" denoting that the amplitude value is not varied as indicated by a reference numeral 21 in FIG. 7C so as to assign the code "L" to the m-th symbol.

Next, when the amplitude value R(m) is beyond the range determined by first and second threshold values TH1(m) and TH2(m), for example, the value is as indicated by a reference numeral 22 in FIG. 7B, the circuit 19 produces as the code "L" to the m-th symbol the code "H" denoting that the amplitude value is varied as indicated by a reference numeral 23 in FIG. 7C.

Figure 4A:
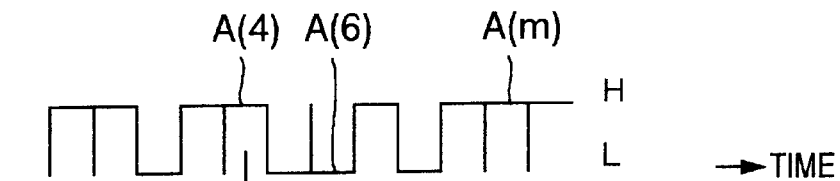
FIGS. 4A and 4B are timing charts for explaining an amplitude modulation of an input signal.

Resultantly, a code string A(m)' from the circuit 19 to be represented is as shown in FIG. 7C, namely, the code is substantially equal to the code value A(m) transmitted as the amplitude component for the m-th symbol from the modulating section on the transmission side shown in FIG. 4A (FIG. 7A).

Figure 8:
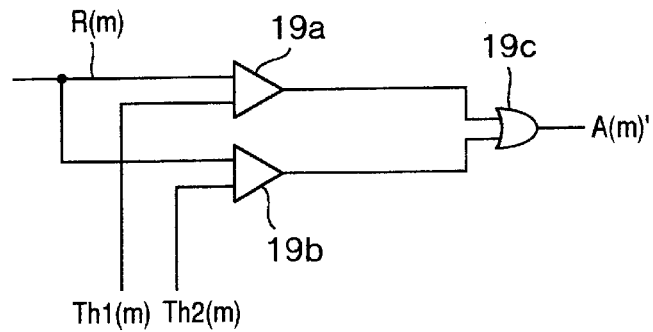
FIG. 8 is a diagram showing a configuration example of an amplitude variation determining circuit of FIG. 6.

FIG. 8 shows in a block diagram a configuration example of the circuit 19 described above. As can be seen from FIG. 8, the circuit includes, for example, comparators 19*a* and 19*b* and an OR gate 19*c*. Receiving the amplitude value R(m) from the circuit 12 and the first threshold value TH1(m), the comparator 19*a* compares these values with each other to produce code "H" and "L" for R(m)<TH1(m) and R(m)≧TH1(m), respectively. The comparator 19*b* receives the amplitude value R(m) and the second threshold value TH2(m) and then compares these values with each other to produce code "H" and "L" for R(m)>TH2(m) and R(m)≧TH2(m), respectively. Receiving the outputs from the comparators 19*a* and 19*b*, the OR gate 19*c* conducts a logical sum operation therebetween. Consequently, the OR gate 19*c* produces code "H" and code "L" respectively for a condition of R(m)≧TH1(m) or R(m)≧TH2(m) and a condition of and R(m)>TH1(m) and R(m)<TH2(m). In short, the OR gate 19*c* outputs the code A(m)'.

Consequently, a signal obtained by demodulating the signal transmitted as the amplitude component is produced as the output A(m)' from the circuit 19. That is, there is implemented an amplitude code demodulating circuit 9 in accordance with the embodiment 6.

Figure 3:
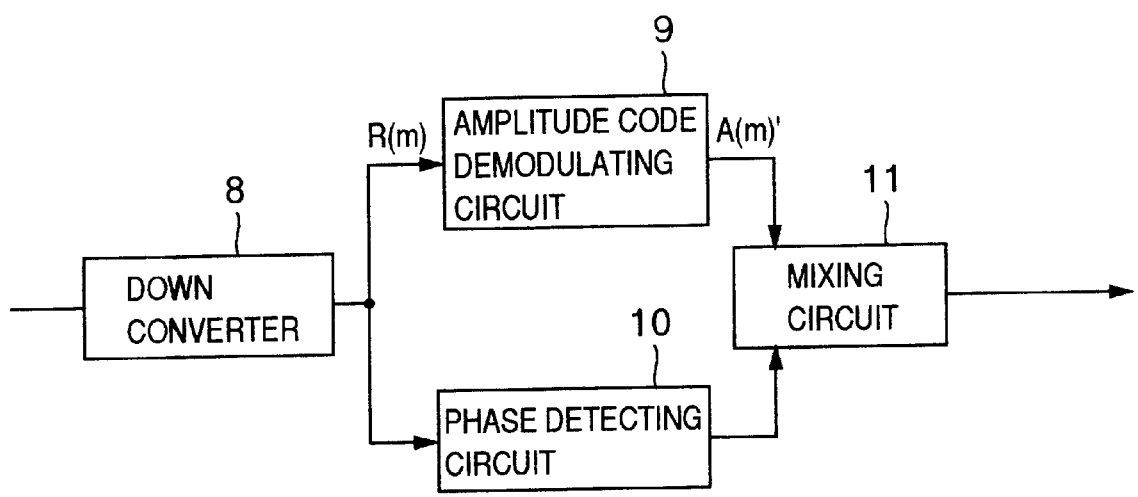
FIG. 3 is a block diagram showing a configuration example of a demodulating section on the reception side in the 16APSK system.

The signal A(m)' transmitted as the amplitude component and demodulated as above is fed as a phase component to a mixing circuit 11 of FIG. 3 to be mixed or coupled with the demodulated signal so as to be outputted as a demodulated information code. Resultantly, the configuration of FIG. 3 provides a function as a demodulating section in the 16APSK system.

In this regard, like in the dividing operation of the prior art, the threshold value obtaining circuit 114 includes an ROM 116 in this embodiment as shown in FIG. 6.

However, for the coefficient values Dth/D1 and Dth/D0 to be multiplied by the amplitude value R(m−1), there are utilized setting values as above. Therefore, the processing of the circuit 114 only includes processing to specify an address of ROM 116 by, for example, an 8-bit code indicating the value R(m−1) and processing to read therefrom the first and second threshold values TH1(m) and TH2(m) which are 8-bit results of multiplication stored at the specified address of the ROM 116.

Resultantly, the required memory capacity of the ROM 116 of the embodiment is a total of 512 bytes, i.e., 256 bytes for each of the two kinds of threshold values. In consequence, the embodiment requires only a ROM having a storage capacity which is about 1/128 that of the ROM 16 of the conventional technology shown in FIG. 5.

Therefore, in accordance with the embodiment, there is required only the ROM having quite a small storage capacity which is about 1/128 that of the memory necessary for the conventional technology. This results in not only the minimization in size of the circuit but also the adoption of a low-priced ROM and hence a small-sized low-priced demodulating facility can be easily implemented.

Additionally, an ROM with a small memory capacity generally operates at a higher speed when compared with ROMs having a large storage capacity, which leads to reduction in the access time.

Consequently, in accordance with the embodiment, the present invention can be easily applied to a transmission system having a transmission rate higher than that of the prior art.

In this connection, the optimal ratio D1/D0 between the radii respectively of the large and small circles and the constant value Dth vary depending on a carrier-to-noise (C/N) ratio of received symbol signals in the transmission system. In other words, the ratio D1/D0 and the constant value Dth change in accordance with a state of the communication line of the system and an environment thereof including weather and utilization statuses of adjacent channels. Therefore, the ratio D1/D0 and the constant value Dth are desirably altered in accordance with a change in the operational environments of the transmission system.

For this purpose, a plurality of kinds of ratios D1/D0 and constant values Dth are prepared in association with the operational environments of the system and the first and second threshold values TH1(m) and TH2(m) are beforehand calculated for each kind of the ratio D1/D0 and the constant value Dth. Since the storage capacity of the ROM 116 required for the threshold value calculation is minimized as described above, these data items may be stored in the remaining area thereof. In this situation, to select a kind of the ratio D1/D0 and the constant value Dth in association with an operational environment of the system, there is arranged a switch, for example, a rotary switch 117. The switch 117 produces an output including, for example, two bits to specify a high-order address of the ROM 116 so as to select the desired kind of the ratio D1/D0 and the constant value D. Resultantly, a change-over operation is accomplished to select an associated memory area of the ROM 116 in which the first and second threshold values TH1(m) and TH2(m) corresponding to the selected ratio D1/D0 and constant value D are stored. In this state, the first and second threshold values TH1(m) and TH2(m) are read therefrom in response to an address R(m−1) from the address circuit 115. As a result, the signal transmitted as an amplitude component can be demodulated under an optimal setting condition in any case.

Figure 9:
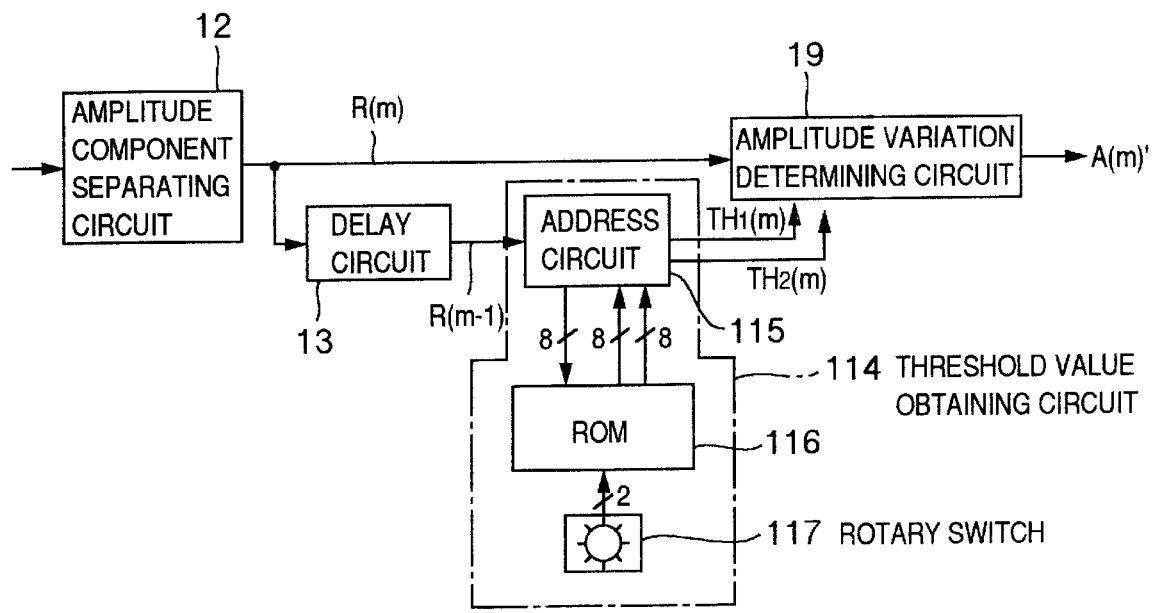
FIG. 9 is a diagram showing an example of variation of the amplitude code demodulating circuit of FIG. 6.

Incidentally, it also possible in FIG. 9 to dispose a plurality of ROMs 116 corresponding to the plural kinds of ratios D1/D0 and constant values so as to select one of the ROMs by the switch 117 in association with the operational environment of the transmission system.

In this regard, the embodiment has been described as an example of a concrete circuit configuration to conduct a multiplying operation to calculate the first and second threshold values TH1(m) and TH2(m) in the circuit 114 in which these values which are obtained as results of multiplication and which are stored in the ROM 116 are read therefrom for the operation.

Figure 10:
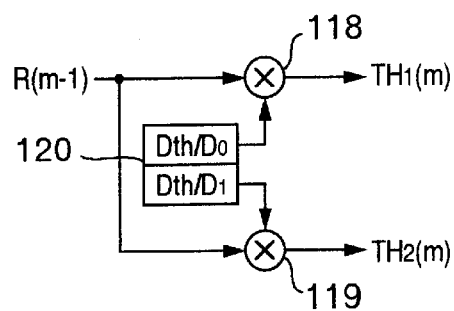
FIG. 10 is a diagram showing a variation example of a threshold value obtaining circuit of the amplitude code demodulating circuit of FIG. 6.

However, as can be seen from FIG. 10, it is naturally be possible in the configuration to that the circuit 114 includes multipliers 118 and 119 and a memory 120 in which coefficient values Dth/D1 and Dth/D0 are stored such that multiplying operations between the setting values of the coefficient values Dth/D1 and Dth/D0 and the amplitude values R(m−1) are carried out in the circuit 114.

On this occasion, although there are required high-speed multiplying circuits, the circuit size and the operation speed can be considerably minimized when compared with the dividing circuit required in the prior art.

In the embodiment, there is employed only one carrier.

However, the embodiment is also applicable to a case in which carries of an orthogonal frequency division modulation (OFDM) system are demodulated in the APSK system. Naturally, there is also attained a similar advantage.

In accordance with the embodiment, since it is possible to minimize the storage capacity of the ROM necessary to demodulate amplitude-modulated components of transmitted signals, the circuit size on the receiving side becomes smaller, which resultantly leads to the implementation of the system at a low cost.

Additionally, an ROM having a small storage capacity can operate at a higher speed when compared with and ROM with a large memory capacity. As a result, in accordance with the embodiment, the present invention can be easily applied to a transmission system having a high transmission rate, and hence a system having a high performance can be constructed at a low cost.

Figure 11:
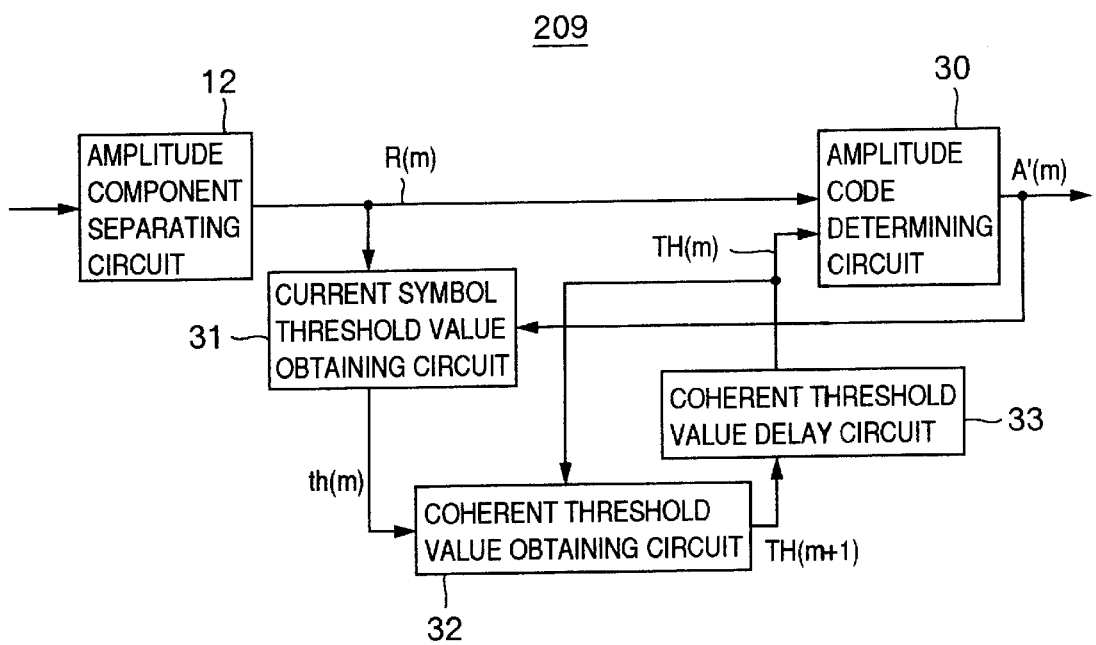
FIG. 11 is a block diagram showing a construction example of an amplitude code demodulating circuit in an amplitude-modulated signal demodulating section on the reception side in an alternative embodiment in accordance with the present invention.

Referring now to FIG. 11 and associated diagrams, description will be given of an amplitude-modulated signal demodulating section on the reception side in a second embodiment in accordance with the present invention. This embodiment provides an amplitude-modulated signal demodulating section capable of easily demodulating codes with a low code error rate without requiring a high-speed ROM having a large capacity.

Figure 2:
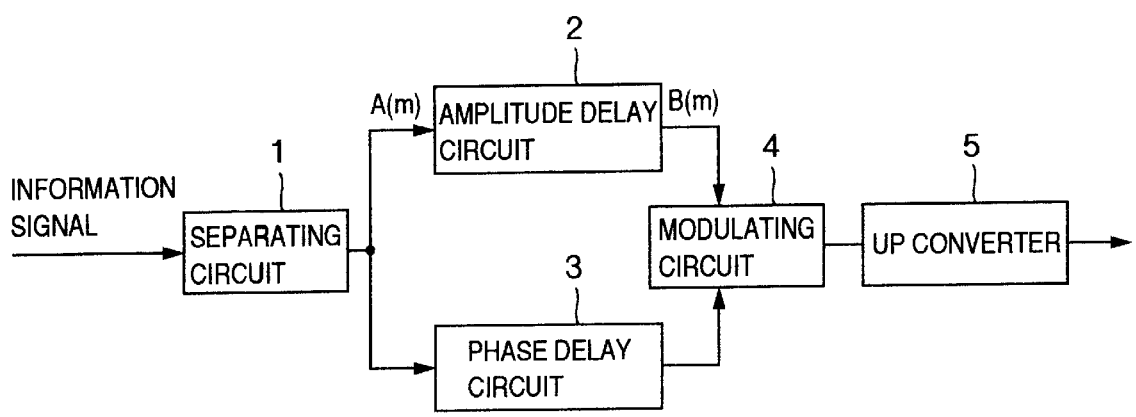
FIG. 2 is a block diagram showing a configuration example of a modulating section on the transmission side in the 16APSK system.

The transmitting facility in the APSK system associated with this embodiment includes a transmission-side modulating section (modulator) having a configuration substantially identical to that of the demodulating section of the prior art shown in FIG. 2 excepting the amplitude delay circuit 2.

The circuit configuration of the demodulating section (demodulator) on the reception side is almost the same as that of the demodulating section of the demodulating facility of the prior art excepting that the amplitude code demodulating circuit 9 of FIG. 3 has the configuration indicated by a reference numeral 209 in FIG. 11, not the configuration of FIG. 5.

In the following description, the configuration and operation of the modulating section on the transmission side will be described in conjunction with FIG. 3, and those of the demodulating section on the reception side will be described with emphasis placed on the internal structure and the processing contents of the amplitude code demodulating circuit 209 which is different from the prior art.

First, in the demodulating section of the embodiment of which the configuration is implemented by removing the delay circuit 2 from the demodulating section of FIG. 2 (3?), a code value A(m) to be transmitted as an amplitude component is directly inputted as an amplitude value B(m) to the modulating circuit 4, the value A(m) being selected from the code separated by the separating circuit 1.

When the value B(m) is one of the binary values "1", there is assigned a signal point on the circumference of the large circle with diameter D1 for the modulation. When the value B(m) is the other binary value "0", there is assigned a signal point on the circumference of the small circle with diameter D0 for the modulation.

Thereafter, the signal modulated by the circuit 4 is fed to the up converter 5 to be transmitted therefrom.

Next, the demodulating section on the reception side includes the demodulating circuit 209 of FIG. 11 in place of the demodulating circuit 9 of FIG. 3.

The received signal fed via the down converter 8 (FIG. 3) and an A/D converter, not shown, to the circuit 209 of FIG. 11 is fist supplied to an amplitude component separating circuit 12 having the same function as for the prior art (FIG. 5) and the first embodiment (FIG. 6) such that an amplitude value is calculated for the received signal.

Figure 4B:
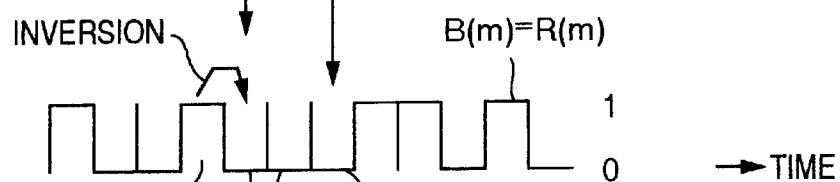
Figure 4C:
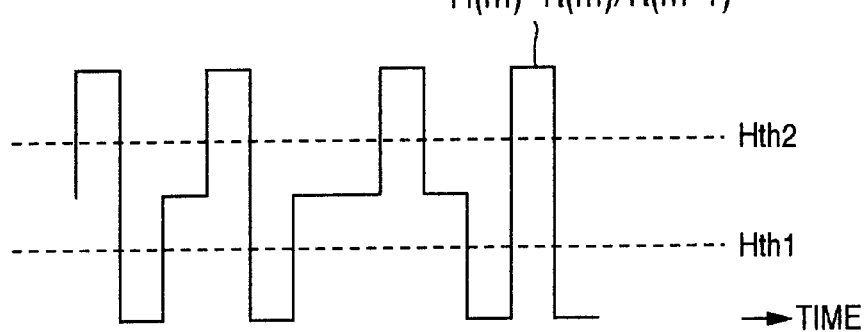
FIG. 4C is a timing chart for explaining an amplitude demodulation of an input signal in a prior art.
Figure 4D:
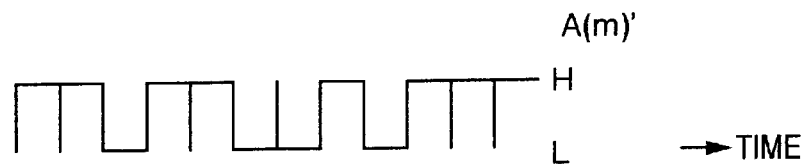
FIG. 4D is a timing chart showing an output waveform from an amplitude code demodulating circuit of FIG. 3.
Figure 7D:
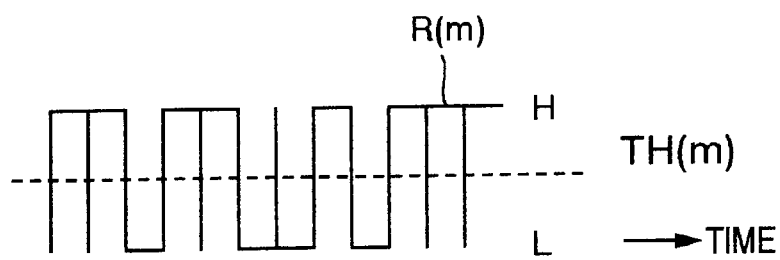
FIG. 7D is a timing chart for explaining an amplitude demodulation of an input signal by an amplitude code demodulating circuit of an embodiment of FIG. 10.

In this case, the amplitude value has a waveform different from that shown in FIG. 4B in relation to the prior art of FIG. 5. As shown in FIG. 7D, the value is represented as an amplitude value R(m) having a waveform equal to that of the code value A(m) on the transmission side shown in FIG. 4A (FIG. 7A). The value R(m) is then supplied to amplitude code determining circuit 30.

After this point, processing varies between the circuit of the prior art and that of the present invention.

That is, the prior art employs the amplitude ratio obtaining circuit 14 to which the amplitude value R(m) and the amplitude value R(m−1) delayed a period of one symbol by the delay circuit 13 are inputted. This embodiment utilizes the amplitude code determining circuit 30 to which the amplitude value R(m) is inputted; moreover, there is supplied, in place of the delayed amplitude value R(m−1), a coherent threshold value TH(m) for the m-th symbol outputted from a coherent threshold delay circuit 33, which will be described later.

In the circuit 30, the amplitude value R(m) is compared with the threshold value TH(m) to produce a demodulated amplitude code A'(m) as shown in FIG. 7D, which will be described later. The circuit 30 may include an ordinary comparator.

① When the relationship between the level of R(m) and TH(m) is TH(m)<R(m), one of the binary values "H" is produced as the demodulated code A'(m) of the m-th symbol.

② When the relationship between the level of R(m) and TH(m) is TH(m)≦R(m), the remaining binary value "L" is created as the demodulated code A'(m) of the m-th symbol.

Figure 7E:
FIG. 7E is a timing chart of an output waveform from the amplitude code demodulating circuit of FIG. 10.

Resultantly, the demodulated code A'(m) generated from the circuit 30 of the embodiment, namely, the waveform of A'(m) from the circuit 209 becomes as shown in FIG. 7E which is obtained by determining the level of the waveform of R(m) shown in FIG. 7D in accordance with the coherent threshold value TH(m). The obtained waveform is the same as that of the code A(m) transmitted as an amplitude component shown in FIG. 4A (FIG. 7A).

Therefore, also in this embodiment, the code transmitted as an amplitude component is demodulated into an output code, which implements the function of the demodulating section in the 16APSK system.

Incidentally, in the circuit 30 of the embodiment, when the noise level of the coherent threshold value TH(m) can be suppressed to be negligible with respect to the noise level of the amplitude value R(m), the code error rate of the demodulated signals is determined only by the noise level of R(m).

That is, since the noise level of R(m) only outputted from the separating circuit 1 is about 3 decibel lower than that of the amplitude ratio H(m) used for the demodulation in the conventional transmitting facility, when the noise level of the coherent threshold value TH(m) can be sufficiently reduced in this embodiment, the signal demodulation can be accomplished with a lower code error rate when compared with the case in which the signal demodulation is achieved by the transmitting facility of the conventional technology.

Moreover, in accordance with the embodiment, since it is guaranteed to acquire the coherent threshold value TH(m) with a low noise level, the demodulation can be conducted with a low code error rate, which will be described later.

In this embodiment, the value TH(m) is calculated by the a current symbol threshold value obtaining circuit 31 and a coherent threshold value obtaining circuit 32 shown in FIG. 11.

The circuit 31 is configured to obtain, in accordance with the value R(m) calculated by the circuit 12 and the code A'(m) demodulated by the circuit 30, a threshold value th(m) corresponding to the amplitude value R(m) of the current symbol. For this purpose, a predeter- mined coefficient value Dth is first determined between the radii D1 and D0 shown in FIG. 1.

In this situation, the value Dth need only be set, for example, to substantially a mean value of radii D1 and D0, namely, Dth≈(D1+D0 )/2.

In this connection, when the probability distribution of noise is taken into consideration, the optimal value of Dth is slightly shifted from the mean value. However, for simplicity of explanation, it is assumed that the Dth is set to the mean value in the description.

Next, in the circuit 31, the threshold value th(m) is attained in accordance with the radii D1 and D0, the coefficient value Dth, and the demodulated code A'(m) as follows.

Figure 12:
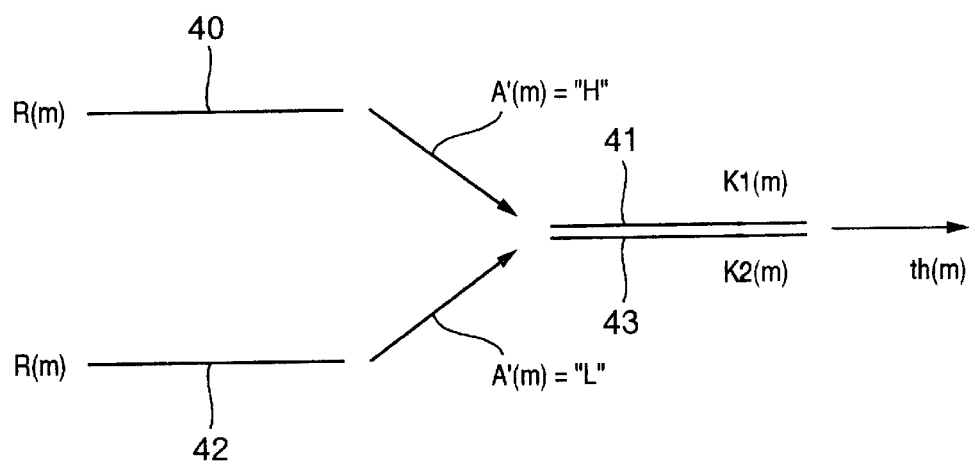
FIG. 12 is a diagram for explaining operation of a current symbol threshold value obtaining circuit in the amplitude code demodulating circuit of FIG. 11.

That is, when the code A'(m) is "H" as indicated by a level 40 of FIG. 12, a first value K1(m) associated with a level 41 of FIG. 12 is calculated as $$K1(m)=R(m) \times Dth/D1$$

to output the result of calculation as the current symbol threshold value, i.e., th(m)=K1(m).

On the other hand, when A'(m) is "L" as indicated by a level 42 of FIG. 12, a second value K2(m) associated with a level 43 of FIG. 12 is obtained as $$K2(m)=R(m) \times Dth/D0$$

to output the result of calculation as the current symbol threshold value, i.e., th(m)=K2(m).

In this case, the attained value th(m) takes an identical value independent of the value of the amplitude code of the received signal as shown in FIG. 12. However, the noise still remains therein.

The circuit 32 is a circuit to lower the level of noise existing in the value th(m). For this purpose, using the current symbol threshold value th(m) from the circuit 31 and the value TH(m) used to demodulate the current symbol code, the circuit 32 achieves operation as follows.

$$TH(m+1)=TH(m) \times (1-1/B)+th(m)/B$$

In the processing of this formula, the threshold value th(m) is cyclically calculated in accordance with the number determined by the numeric value B for each symbol. In consequence, when the value B is set to a positive natural number larger than one, the noise level of TH(m+1) can be considerably lowered than that of R(m).

Figure 13:
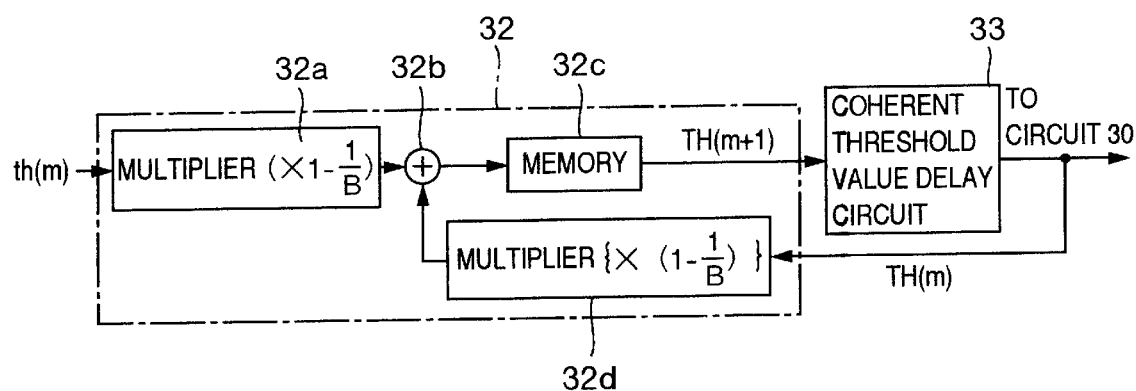
FIG. 13 is a block diagram showing a configuration example of a coherent threshold value obtaining circuit in the amplitude code demodulating circuit of FIG. 11.

FIG. 13 shows in a block diagram a configuration example of the coherent threshold value obtaining circuit 32 described above. The circuit 32 includes a multiplier 32a which receives the threshold value th(m) from the circuit 31 to multiply the value th(m) by 1/B, a multiplier 32d which receives the threshold value TH(m) from the circuit 33 to multiply the value TH(m) by (1−1/B), an adder 32b to add outputs from the multipliers 32a and 32d to each other, and a memory (e.g., a flip-flop or latch circuit) 32c which temporarily stores therein an output from the adder 32 and then outputs the stored data as the (m+1)-th coherent threshold value TH(m+1) to the circuit 33.

Assume now that the value of B is set to, for example, 16. Then, the noise level of the result of calculation TH(m+1) is reduced to about 1/32 that of the amplitude value R(m). Namely, the noise level can be lowered to a level negligible with respect to the noise level of R(m).

The result TH(m+1) is then produced as a coherent threshold value of the (m+1)-th symbol from the circuit 32. Consequently, there is attained a coherent threshold value TH(m) with a sufficiently low noise from the circuit 32.

The value TH(m+1) from the circuit 32 is delayed a period of one symbol through the delay circuit 33 to be fed to the circuit 30 together with the amplitude value R(m+1) of the (m+1)-th symbol obtained from the circuit 12. These values are compared with each other to achieve demodulation for the code A'(m+1) of the (m+1)-th symbol such that the amplitude code value A'(m) is produced from the circuit 209.

The code A'(m) resultant from demodulation by the circuit 209 is thereafter delivered to the mixing or combining circuit 11 together with the code obtained through demodulation by the circuit 10 of FIG. 3. These signals are combined with each other to be outputted as a demodulated information code or signal. In this case, since the value TH(m+1) from the circuit 32 has a sufficiently lowered noise level as described above, the code error rate of the code A'(m+1) is determined only by the noise level of R(m+1).

In consequence, when compared with the case of prior art in which the demodulation is conducted with an amplitude ratio H(m) having a noise level higher about 3 dB than that of the amplitude value, the embodiment can demodulate an amplitude code having a lower code error rate.

In other words, in the transmitting facility of the embodiment, the code having an error rate substantially equal to that of the code transmitted by the transmitting facility of the prior art can be obtained even when the noise level of the received signal is further 3 dB increased.

In the circuit 32, the value B used to attain the current symbol threshold value th(m) need only be a positive natural number larger than 1 in general as described above.

However, when the value of B is set to exponents of two ($=2^n$) such as 16, 32, and 64, the multiplication by 1/B can be implemented only by a bit shift operation, and hence this configuration minimizes the circuit size.

Additionally, the operation executed in the circuit 32 may be other than that described above, namely, using $$TH(m+1) = \left\{ \sum_{i=1}^{N-1} TH(m-i) \right\} / N,$$

the coherent threshold values TH(m−i) of N symbols in the past (Σ indicates that the values are added to each other for i=1, 2, ..., N−1) are simply added to each other to obtain a mean value to thereby produce an output therefrom. In the expression, N denotes an integer equal to or more than two.

A circuit for this operation is attended with a drawback that the circuit becomes great to store therein the coherent threshold values of N symbols in the past.

However, for the reduction of noise, the circuit has an advantage of reducing noise with a higher efficiency when compared with the circuit described in the embodiment above.

In addition, there may be considered other internal configurations of the circuit 32, for example, when the value th(m) is far away from the value TH(m), the constant value B is minimized to quickly obtain the result. That is, only when the noise level of the value TH(m) can be decreased, it is naturally possible to apply the known noise reduction method to the internal configuration of the circuit 32.

Subsequently, description will be given of a concrete example of constitution of the circuit 31.

Various types of circuit configurations are possible for the circuit 31. First, FIG. 14 shows a first example thereof.

Figure 14:
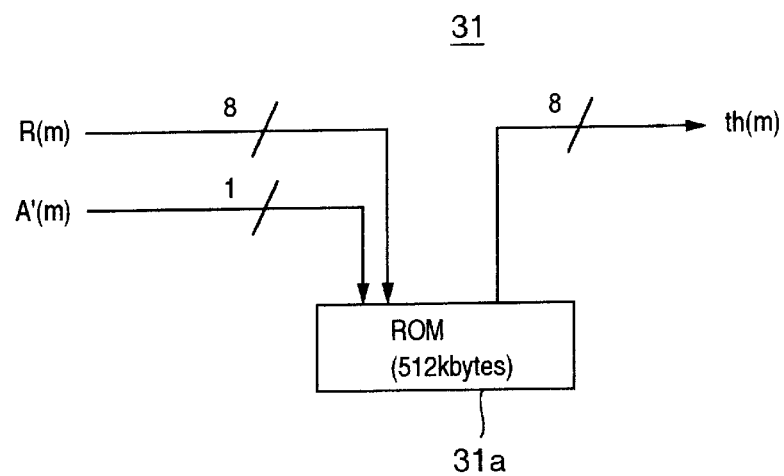
FIG. 14 is a block diagram showing a configuration example of a current symbol threshold value obtaining circuit in the amplitude code demodulating circuit of FIG. 11.

In the example of FIG. 14, there is shown a circuit in which the calculated results of values K1(m) and K2(m) for all values of an arbitrary amplitude value R(m) are beforehand stored in a memory, e.g., an ROM (ROM table) 31a. For this purpose, the circuit is configured such that the calculated result is read therefrom as a threshold value th(m) by setting the value R(m) and the demodulated code A'(m) to an address of the ROM 31a. Incidentally, there may be disposed an address circuit similar to the address circuit 115 shown in FIG. 6.

Consequently, the circuit also includes an ROM like the memory 16 in the conventional technology. However, in the embodiment of FIG. 14, the coefficients Th/D1 and Th/D0 to be multiplied by the value R(m) are only predetermined coefficient values as described above. Therefore, as can be seen from the drawing, it is only necessary to specify the address of the ROM 31a only by a 9-bit code including a code, e.g. an 8-bit code representing the value R(m) and a 1-bit code of the code A'(m) so as to read an 8-bit product stored at the specified address. Resultantly, the required storage capacity of the ROM is only 512 bytes which is about 1/128 of that of the ROM used in the divider circuit of the prior art. Consequently, the circuit size can be remarkably reduced in accordance with the embodiment.

Figure 15:
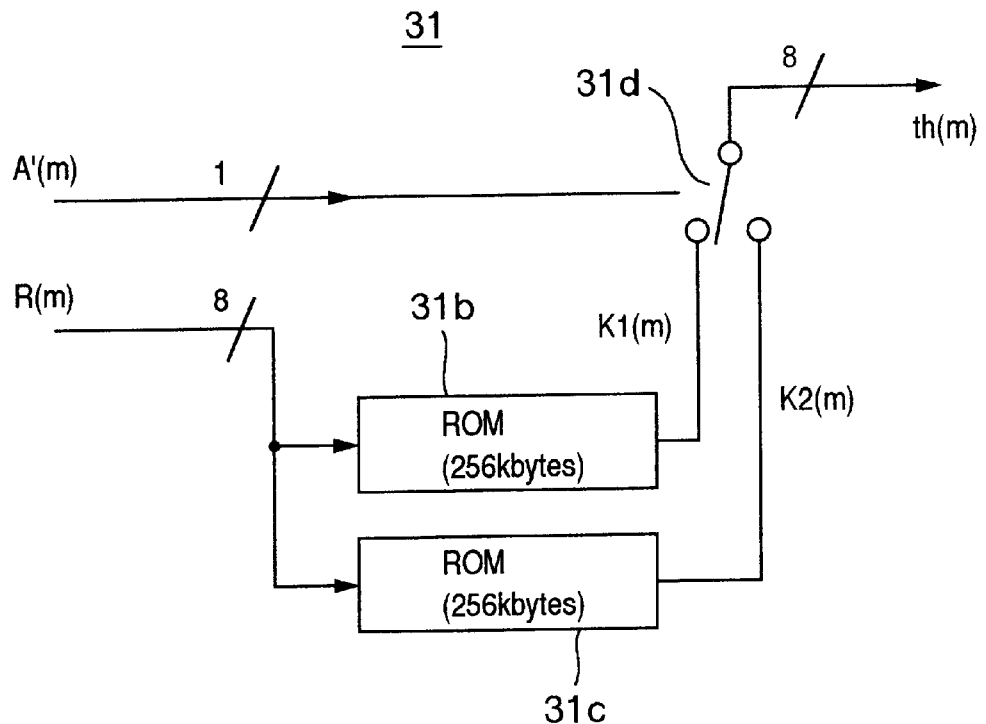
FIG. 15 is a block diagram showing another configuration example of the current symbol threshold value obtaining circuit of FIG. 11.

Next, FIG. 15 shows a second example of the circuit 31 including two memories, e.g., ROMs 31b and 31c such that the calculated results of K1(m) and K2(m) for all values of R(m) are stored in the ROMs 31b and 31c, respectively.

In this situation, the value of R(m) is used as an address common to the ROMs 31b and 31c to simultaneously read the values K1(m) and K2(m) therefrom. In the configuration, one of the obtained values is selected by a change-over operation of a switch 31d in accordance with the value of the demodulated code A'(m) as shown in FIG. 12 so as to be outputted as the threshold value th(m). In this regard, there may be included an address circuit similar to the address circuit 115 of FIG. 6.

Consequently, the total storage capacity of the ROMs 31b and 31c need only be 512 bytes also in the example of FIG. 15 for the same reason as for the first example of FIG. 14, which hence results in a considerable reduction in the circuit size.

Figure 16:
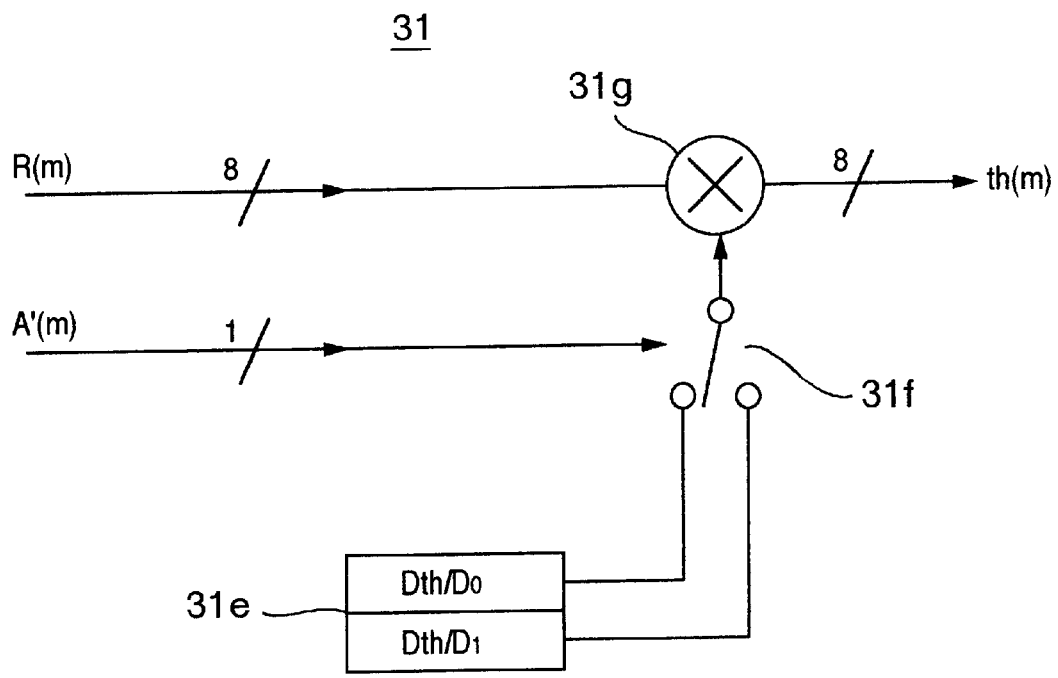
FIG. 16 is a block diagram showing still another configuration example of the current symbol threshold value obtaining circuit of FIG. 11.

Additionally, FIG. 16 shows a third example of the circuit 31. This circuit includes a memory, i.e., a memory circuit 31e in which the coefficient values Dth/d0 and Dth/D1 are respectively stored in advance. In this configuration, one of the coefficient value is selected by a switch 31f controlled to conduct a change-over operation in response to the value of A'(m) and is fed to a multiplier circuit 31g to be multiplied by the value R(m). The resultant product is produced as the threshold value th(m).

Therefore, the example requires a high-speed multiplying circuit. However, the requirement for the operation speed is less than that of the dividing circuit of the prior art. Consequently, the circuit size can be remarkably minimized.

In short, the effect of the embodiment above is as follows.

First, in the demodulating apparatus of the transmitting facility in the embodiment, the noise level of the coherent threshold value TH(m) for the demodulation can be minimized to be negligible with respect to the noise level of the amplitude value R(m). Consequently, even in a state in which the noise of the received signal is 3 dB increased, there can be obtained the code having a code error rate substantially equal to that of the code demodulated by the conventional transmitting facility. Therefore, it is possible to easily implement a high-performance transmitting facility having a low S/N ratio.

Moreover, even in a case of an embodiment in which the circuit 31 includes an ROM, the ROM requires only a small storage capacity which is about 1/128 of that of the ROM 16 used in the dividing circuit of the prior art shown in FIG. 5. Resultantly, in addition to an advantage of the small circuit size, there can be used a low-priced ROM. Consequently, there can be implemented a small-sized low-prices transmitting facility.

Furthermore, even in a case of an embodiment in which the circuit 31 includes a multiplier circuit as shown in FIG. 16, only the variable R(m) is used. In contrast therewith, in the multiplying circuit of the prior art, the conventional technology uses the variables R(m) and R(m−1). Therefore, also in this embodiment. Resultantly, when compared with the prior art, the circuit size can be reduced and the requirement for the high-speed operation of the circuit elements will be milder.

Incidentally, the optimal values of the coefficient values Dth and the ratio D1/D2 between the radii of the large and small circles shown in FIG. 2 vary depending on the C/N ratio of the received signal.

Like in the first embodiment shown in FIG. 9, it may also be possible to beforehand store, in association with the various values of the ratio D1/D2 and the value Dth, the calculated results of a plurality o pairs of threshold values K1(m) and K2(m) so as to select the calculated results to be read in accordance with the operating condition such as a signal receiving state.

With the provision above, the demodulation is accomplished under an optimal setting condition in any situation and hence the high performance there of can be retained. Under this condition, since the storage capacity required for the inherent operation is minimized in this embodiment, there arise no fear of increase in the circuit size though the storage capacity is additionally required, which leads to an easy implementation of a highly efficient transmitting facility.

Incidentally, in the description of the embodiment, there is used only one kind of carrier for transmission.

However, the embodiment is not to be regarded as limitation. Namely, it is to be appreciated that the similar advantage is attained by applying the embodiment to an operation of modulating various carries of an orthogonal frequency division modulation (OFDM) system in accordance with the APSK system.

As above, in accordance with the embodiment, the necessary storage capacity of the memory is remarkably reduced to be, e.g., about 1/128 of the memory capacity of the conventional technology. Resultantly, a small ROM can be used in the circuit configuration and hence the circuit size is minimized and the circuit can be manufactured at a low cost.

Additionally, the embodiment improves the signal-to-noise ratio by three decibels in principle when compared with the prior art. Therefore, even in a state in which the noise of the received signal is 3 dB increased, there can be attained a code with a code error rate substantially equal to that of the code demodulated by the transmitting facility of the prior art. In consequence, there can be easily provided a high-performance transmitting facility satisfactorily operating even when the signal-to-noise ratio is deteriorated.

Figure 17:
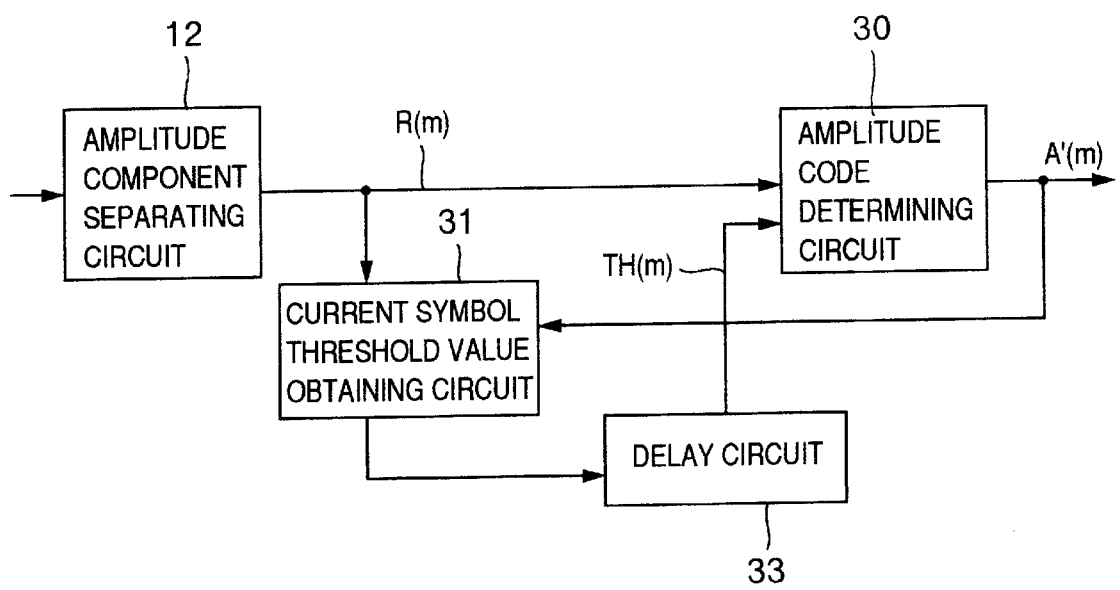
FIG. 17 is a block diagram showing a variation example of the current symbol threshold value obtaining circuit of FIG. 11.

In this connection, it may also be possible in the second embodiment shown in FIG. 11 to remove therefrom the coherent threshold value obtaining circuit 32 so as to obtain the configuration of FIG. 17, which leads to an advantage of reduction in the memory capacity.

Moreover, it may also be possible in the first embodiment shown in FIGS. 6, 9, etc. to provide the coherent threshold value obtaining circuit 32 and the coherent threshold value delay circuit 33 as in the second embodiment shown in FIG. 11, which leads to, in addition to an advantage of the reduction in the memory capacity as in the second embodiment, an advantage of minimization of the code error rate.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A demodulating apparatus for demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter on the complex plane, comprising:

a down converter for conducting a frequency reduction for the amplitude-modulated signal;

an amplitude code demodulating circuit for demodulating an amplitude component Rm of each symbol of the amplitude-modulated signal from the down converter;

a phase detecting circuit for demodulating a phase component of each symbol of the amplitude-modulated signal from the down converter; and a mixing circuit for mixing the demodulated codes from the amplitude code demodulating circuit and the phase detecting circuit with each other, restoring a digital information code, and outputting the code therefrom, wherein the amplitude code demodulating circuit includes:

a threshold value obtaining circuit for obtaining a first threshold value $TH1(m)=R(m-1) \times Dth/D1$ and a second threshold value $TH2(m)=R(m-1) \times Dth/D0$ in accordance with an amplitude value $R(m-1)$ of an $(m-1)$-th symbol received one symbol in advance of an m-th symbol of the amplitude-modulated signal currently being received from the down converter, where D1 indicates a radius of the first circle, D0 denotes a radius of the second circle, Dth stands for a constant between the radii D1 and D0; and an amplitude variation determining circuit for comparing an amplitude value $R(m)$ of the m-th symbol of the amplitude-modulated signal currently being received from the down converter respectively with the first and second first threshold values $TH1(m)$ and $TH2(m)$, producing one of the binary values when the value $R(m)$ is in a range between the values $TH1(m)$ and $TH2(m)$, producing the other one thereof when the value $R(m)$ is beyond the range, and outputting the binary value as a code obtained by demodulating the amplitude component of the m-th symbol.

2. A demodulating apparatus in accordance with claim 1, wherein:

the amplitude code demodulating circuit further includes a delay circuit for delaying one symbol the m-th symbol of the amplitude-modulated signal currently being received from the down converter and outputting therefrom the $(m-1)$-th symbol received one symbol in advance of the m-th symbol; and the threshold value obtaining circuit includes a memory in which the first and second threshold values $TH1(m)$ and $TH2(m)$ beforehand attained for each amplitude value $R(m-1)$ are stored and an access circuit for accessing the memory by setting as an address the amplitude value $R(m-1)$ of the $(m-1)$-th symbol from the delay circuit and reading therefrom the first and second threshold values $TH1(m)$ and $TH2(m)$ corresponding to the $(m-1)$-th symbol.

3. A demodulating apparatus in accordance with claim 1, wherein the threshold value obtaining circuit further includes:

a memory for storing therein the first and second threshold values $TH1(m)$ and $TH2(m)$ beforehand attained for each amplitude value $R(m-1)$ for each pair of a plurality of kinds of coefficient values $Dth/D1$ and $Dth/D0$ beforehand prepared;

selecting means for selecting either one of the pairs of coefficients values $Dth/D1$ and $Dth/D0$; and an access circuit for accessing the memory by setting as an address the amplitude value $R(m-1)$ of the $(m-1)$-th symbol from the delay circuit and reading therefrom the first and second threshold values $TH1(m)$ and $TH2(m)$ selected by the selecting means.

4. A demodulating apparatus in accordance with claim 1, wherein:

the amplitude code demodulating circuit further includes a delay circuit for delaying one symbol the m-th symbol of the amplitude-modulated signal currently being received from the down converter and outputting therefrom the $(m-1)$-th symbol received one symbol in advance of the m-th symbol; and the threshold value obtaining circuit includes a memory in which the coefficient values $Dth/D1$ and $Dth/D0$ are stored and a first multiplier and a second multiplier for multiplying the amplitude value $R(m-1)$ of the $(m-1)$-th symbol from the delay circuit respectively by the coefficient values Dth/D1 and Dth/D0 and thereby obtaining the first and second threshold values TH1(m) and TH2(m) corresponding to the (m−1)-th symbol.

5. A demodulating apparatus for demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter on the complex plane, comprising:

a down converter for conducting a frequency reduction for the amplitude-modulated signal;

an amplitude code demodulating circuit for demodulating an amplitude component of each symbol of the amplitude-modulated signal from the down converter;

a phase detecting circuit for demodulating a phase component of each symbol of the amplitude-modulated signal from the down converter; and a mixing circuit for mixing the demodulated codes from the amplitude code demodulating circuit and the phase detecting circuit with each other into a digital information code and outputting the code therefrom, wherein the amplitude code demodulating circuit includes:

a threshold value obtaining circuit for obtaining, in accordance with an amplitude value of an amplitude component of each symbol of the amplitude-modulated signal from the down converter, a first threshold value and a second threshold value having a predetermined relationship with the amplitude value, and an amplitude variation determining circuit for comparing the amplitude value of the amplitude component of each symbol of the amplitude-modulated signal from the down converter respectively with the first and second first threshold values, determining a variation in the amplitude value of the amplitude component of each symbol, and producing a signal resultant from the determination as a code obtained by demodulating the amplitude component.

6. A demodulating apparatus in accordance with claim 5, wherein the threshold value obtaining circuit multiplies the amplitude value of the amplitude component of each symbol of the amplitude-demodulated signal from the down converter by a first predetermined coefficient value and a second predetermined coefficient value and thereby obtains the first and second threshold values.

7. A demodulating apparatus in accordance with claim 6, wherein:

the amplitude code demodulating circuit further includes a delay circuit for delaying one symbol the m-th symbol of the amplitude-modulated signal currently being received from the down converter and outputting therefrom the (m−1)-th symbol received one symbol in advance of the m-th symbol; and the threshold value obtaining circuit includes a memory in which the first and second threshold values beforehand attained for each amplitude value R(m−1) of the (m−1)-th symbol are stored and an access circuit for accessing the memory by setting as an address the amplitude value R(m−1) of the (m−1)-th symbol from the delay circuit and reading therefrom the first and second threshold values corresponding to the (m−1)-th symbol.

8. A demodulating apparatus in accordance with claim 7, wherein the threshold value obtaining circuit includes:

a memory for storing therein the first and second threshold values beforehand attained for each amplitude value R(m−1) for each pair of a plurality of kinds of first and second predetermined coefficient values beforehand prepared;

selecting means for selecting either one of the pairs of first and second coefficients values; and an access circuit for accessing the memory by setting as an address the amplitude value R(m−1) of the (m−1)-th symbol from the delay circuit and reading therefrom the first and second threshold values selected by the selecting means.

9. A demodulating apparatus in accordance with claim 6, wherein:

the amplitude code demodulating circuit further includes a delay circuit for delaying one symbol the m-th symbol of the amplitude-modulated signal currently being received from the down converter and outputting therefrom the (m−1)-th symbol received one symbol in advance of the m-th symbol; and the threshold value obtaining circuit includes a memory in which the first and second predetermined coefficient values are stored and a first multiplier and a second multiplier for multiplying the amplitude value R(m−1) of the (m−1)-th symbol from the delay circuit respectively by the first and second predetermined coefficient values read from the memory and thereby obtaining the first and second threshold values corresponding to the (m−1)-th symbol.

10. In a demodulating apparatus for demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter on the complex plane, an amplitude code demodulating circuit for demodulating an amplitude component Rm of each symbol of the amplitude-demodulated signal comprises:

a threshold value obtaining circuit for obtaining a first threshold value TH1(m)=R(m−1)×Dth/D1 and a second threshold value TH2(m)=R(m−1)×Dth/D0 in accordance with an amplitude value R(m−1) of an (m−1)-th symbol received one symbol in advance of an m-th symbol of the amplitude-modulated signal currently being received, where D1 indicates a radius of the first circle, D0 denotes a radius of the second circle, Dth stands for a constant established between the radii D1 and D0; and an amplitude variation determining circuit for comparing an amplitude value R(m) of the m-th symbol of the amplitude-modulated signal currently being received respectively with the first and second first threshold values TH1(m) and TH2(m), producing one of the binary values when the value R(m) is in a range between the values TH1(m) and TH2(m), producing the other one thereof when the value R(m) is beyond the range, and outputting the binary value as a code obtained by demodulating the amplitude component.

11. An amplitude code demodulating apparatus in accordance with claim 10, further including a delay circuit for delaying one symbol the m-th symbol of the amplitude-modulated signal currently being received and outputting therefrom the (m−1)-th symbol received one symbol in advance of the m-th symbol, wherein the threshold value obtaining circuit includes a memory in which the first and second threshold values TH1(m) and TH2(m) beforehand attained for each amplitude value R(m−1) are stored and an access circuit for accessing the memory by setting as an address the amplitude value R(m−1) of the (m−1)-th symbol from the delay circuit and reading therefrom the first and second threshold values TH1(m) and TH2(m) corresponding to the (m−1)-th symbol.

12. A demodulating method of demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter on the complex plane, comprising the following steps of:

(a) obtaining, in accordance with an amplitude value of an amplitude component of each symbol of a received amplitude-modulated signal, a first threshold value and a second threshold value having a predetermined relationship with the amplitude value; and (b) comparing an amplitude value of an amplitude component of each symbol of the successively received amplitude-modulated signal with the first and second first threshold values, determining an amplitude variation in the amplitude component of each symbol in accordance with a result from the comparison, and outputting therefrom a signal representing a result from the determination as a code obtained by demodulating the amplitude component.

13. A demodulating method in accordance with claim 12, wherein the step (a) includes multiplying the amplitude value of the amplitude component of each symbol of the received amplitude-modulated signal by a first predetermined coefficient value and a second predetermined coefficient value and thereby obtaining the first and second threshold values, respectively.

14. A demodulating apparatus for demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter, comprising:

a down converter for conducting a frequency reduction for the amplitude-modulated signal;

an amplitude code demodulating circuit for demodulating an amplitude component of each symbol of the amplitude-modulated signal from the down converter;

a phase detecting circuit for demodulating a phase component of each symbol of the amplitude-modulated signal from the down converter; and a mixing circuit for mixing the demodulated codes from the amplitude code demodulating circuit and the phase detecting circuit with each other, restoring a digital information code, and outputting the code therefrom, wherein the amplitude code demodulating circuit includes:

an amplitude code determining circuit for comparing an amplitude value R(m) of the m-th symbol of the amplitude-modulated signal received from the down converter respectively with a coherent threshold value TH(m) for the m-th symbol from a coherent threshold value delay circuit, determining a variation in the amplitude value of the amplitude component of the m-th symbol in accordance with a result from the comparison, and outputting a signal indicating the comparison result as an amplitude code obtained by demodulating the amplitude component of the m-th symbol;

a current symbol threshold value obtaining circuit for obtaining, in accordance with the amplitude value of the amplitude component of the m-th symbol of the amplitude-modulated signal from the down converter and the amplitude code of the m-th symbol from the amplitude code determining circuit, a first threshold value or a second threshold value having a predetermined relationship with the amplitude value and the amplitude code; and a coherent threshold value obtaining circuit for attaining a coherent threshold value TH(m+1) for the (m+1)-th symbol in accordance with the coherent threshold value TH(m) for the m-th symbol from the coherent threshold value delay circuit and the first or second threshold value from the current symbol threshold value obtaining circuit, wherein the coherent threshold value delay circuit delays one symbol the coherent threshold value TH(m+1) for the (m+1)-th symbol from the coherent threshold value obtaining circuit to thereby input the coherent threshold value TH(m+1) to the amplitude code determining circuit when the (m+1)-th symbol is inputted to the amplitude code determining circuit.

15. A demodulating apparatus in accordance with claim 14, wherein the current symbol threshold value obtaining circuit obtains one of the first and second threshold values having a predetermined relationship with the amplitude value of the amplitude component of each symbol of the amplitude-modulated signal from the down converter in accordance with the amplitude code from the amplitude code determining circuit.

16. A demodulating apparatus in accordance with claim 15, wherein the current symbol threshold value obtaining circuit includes a memory in which the first and second threshold values beforehand obtained for each amplitude value R(m) of the amplitude component are stored, the current symbol threshold value obtaining circuit accessing the memory by setting as an address the amplitude value of the amplitude component of the symbol of the amplitude-modulated signal from the down converter and the amplitude code from the amplitude code determining circuit and obtaining as the threshold value th(m) one of the first and second threshold values for the m-th symbol in accordance with the amplitude code from the amplitude code determining circuit.

17. A demodulating apparatus for demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter, comprising:

a down converter for conducting a frequency reduction for the amplitude-modulated signal;

an amplitude code demodulating circuit for demodulating an amplitude component R(m) of each symbol of the amplitude-modulated signal from the down converter;

a phase detecting circuit for demodulating a phase component of each symbol of the amplitude-modulated signal from the down converter; and a mixing circuit for mixing the demodulated codes from the amplitude code demodulating circuit and the phase detecting circuit with each other, restoring a digital information code, and outputting the code therefrom, wherein the amplitude code demodulating circuit includes:

an amplitude code determining circuit for comparing an amplitude value R(m) of the amplitude component of the m-th symbol of the amplitude-modulated signal successively received from the down converter with a coherent threshold value TH(m) for the m-th symbol from a coherent threshold value delay circuit and producing one of the binary values when the comparison results in R(m)>TH(m) and the other one thereof when the comparison results in R(m)<TH(m);

a current symbol threshold value obtaining circuit for obtaining a first threshold value K1(m)=R(m)× Dth/D1 in accordance with the amplitude value R(m) of the m-th symbol of the amplitude-modulated signal received from the down converter and the demodulated amplitude code A'(m) of the m-th symbol from the amplitude code determining circuit when the code A'(m) is one of the binary values and outputting therefrom the first value as the threshold value th(m)=K1(m) of the m-th symbol, the current symbol threshold value obtaining circuit obtaining a second threshold value K1(m)=R(m)× Dth/) when the code A'(m) is the other one of the binary values and outputting therefrom the second value as the threshold value th(m)=K2(m) of the m-th symbol; and a coherent threshold value obtaining circuit for attaining a coherent threshold value TH(m+1) for the (m+1)-th symbol in accordance with the coherent threshold value TH(m) for the m-th symbol from the coherent threshold value delay circuit and the first or second threshold value TH(m+1) from the current symbol threshold value obtaining circuit, the coherent threshold value delay circuit delaying a period of one symbol the coherent threshold value TH(m+1) for the (m+1)-th symbol from the coherent threshold value obtaining circuit and thereby inputting the coherent threshold value TH(m+1) to the amplitude code determining circuit when the (m+1)-th symbol is inputted to the amplitude code determining circuit.

18. A demodulating apparatus in accordance with claim 17, wherein the coherent threshold value obtaining circuit obtains the coherent threshold value TH(m) for the (m+1)-th symbol in accordance with $$TH(m+1)=TH(m)\times(1-1/B)+th(m)/B$$

where, TH(m) is the coherent threshold value for the m-th symbol from the coherent threshold value delay circuit, th(m) indicates the first or second threshold value from the current symbol threshold value obtaining circuit, and B designates a predetermined positive integer.

19. A demodulating apparatus in accordance with claim 17, wherein the current symbol threshold value obtaining circuit includes a memory in which the first and second threshold values th(m)=K1(m) and th(m)=K2(m) beforehand attained for each amplitude value R(m−1) of all amplitude components are stored, wherein the current symbol threshold value obtaining circuit accesses the memory by setting as an address the amplitude value R(m) of the amplitude component of the m-th symbol of the amplitude-modulated signal from the down converter and the amplitude code A'(m) from the amplitude code determining circuit and obtaining as the threshold value th(m) one of the first and second threshold values th(m)=K1(m) and th(m)= K2(m) from the amplitude code determining circuit in accordance with the amplitude code A'(m).

20. A demodulating apparatus in accordance with claim 17, wherein the current symbol threshold value obtaining circuit includes:

a first memory in which the first threshold value th(m)= K1(m) beforehand attained for each amplitude value R(m) of all amplitude components are stored, the first memory being accessed with an address set to the amplitude value R(m) of the amplitude component of the m-th symbol of the amplitude-modulated signal from the down converter and thereby reading out therefrom the first threshold value th(m)=K1(m) corresponding to the m-th symbol;

a second memory in which the second threshold value th(m)=K2(m) beforehand attained for each amplitude value R(m) of all amplitude components are stored, the first memory being accessed with an address set to the amplitude value R(m) of the amplitude component of the m-th symbol of the amplitude-modulated signal from the down converter and thereby reading out therefrom the second threshold value th(m)=K1(m) corresponding to the m-th symbol; and a switch for selecting either one of the first and second memories in response to a level of the amplitude code A'(m) from the amplitude code determining circuit and outputting the threshold value th(m) therefrom.

21. A demodulating apparatus in accordance with claim 17, wherein the current symbol threshold value obtaining circuit includes:

a memory in which the coefficients Dth/D1 and Dth/D0 are stored;

a switch reading either one of the coefficients Dth/D1 and Dth/D0 from the memory in response to a level of the amplitude code A'(m) from the amplitude code determining circuit; and a multiplier for multiplying the coefficient read from by switch by the amplitude value R(m) of the amplitude component of the m-th symbol of the amplitude-modulated signal from the down converter and outputting a result of the multiplication as the threshold value th(m).

22. An amplitude code demodulating circuit for use in a demodulating apparatus for demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter, comprising:

an amplitude code determining circuit for comparing an amplitude value R(m) of an amplitude component of an m-th symbol of a received amplitude-modulated signal with a coherent threshold value TH(m) for the m-th symbol from a coherent threshold value delay circuit, determining a variation in the amplitude value of the amplitude component of the m-th symbol in accordance with a result from the comparison, and outputting a signal indicating the comparison result as an amplitude code obtained by demodulating the amplitude component of the m-th symbol;

a current symbol threshold value obtaining circuit for obtaining, in accordance with the amplitude value of the amplitude component of the m-th symbol of the received amplitude-modulated signal and the amplitude code of the m-th symbol from the amplitude code determining circuit, a first or second threshold value having a predetermined relationship with the amplitude value and the amplitude code;

a coherent threshold value obtaining circuit for attaining a coherent threshold value TH(m+1) for the (m+1)-th symbol in accordance with the coherent threshold value TH(m) for the m-th symbol from the coherent threshold value delay circuit and the first or second threshold value from the current symbol threshold value obtaining circuit, wherein the coherent threshold value delay circuit delays a period of one symbol the coherent threshold value TH(m+1) for the (m+1)-th symbol from the coherent threshold value obtaining circuit to thereby input the coherent threshold value TH(m+1) to the amplitude code determining circuit when the (m+1)-th symbol is inputted to the amplitude code determining circuit.

23. A demodulating apparatus in accordance with claim 22, wherein the current symbol threshold value obtaining circuit obtains one of the first and second threshold values having a predetermined relationship with the amplitude value of the amplitude component of each symbol of the amplitude-modulated signal in accordance with the amplitude code from the amplitude code determining circuit.

24. A demodulating method of demodulating amplitude-demodulated signals in an amplitude phase shift keying (APSK) system for conducting an amplitude modulation by setting signal points as information codes on a complex plane representing a signal space of transmission signals onto circumferences of two concentric circles including a first circle having a first diameter and a second circle having a second diameter smaller than the first diameter, comprising the steps of:

(a) comparing an amplitude value R(m) of an amplitude component of an m-th symbol of a received amplitude-modulated signal with a coherent threshold value TH(m) for the m-th symbol, determining a variation in the amplitude value of the amplitude component of the m-th symbol in accordance with a result from the comparison, and attaining a signal indicating the comparison result as a demodulated amplitude code of the m-th symbol;

(b) obtaining, in accordance with the amplitude value of the amplitude component of the m-th symbol of the received amplitude-modulated signal and the demodulated amplitude code of the m-th symbol, a first or second threshold value having a predetermined relationship with the amplitude value and the amplitude code;

(c) attaining a coherent threshold value TH(m+1) for the (m+1)-th symbol in accordance with the coherent threshold value TH(m) for the m-th symbol and the first or second threshold value; and (d) delaying a period of one symbol the coherent threshold value TH(m+1) for the (m+1)-th symbol and thereby comparing in the step 8a) the amplitude value R(m+1) of the amplitude component of the (m+1)-th symbol with the coherent threshold value TH(m+1) of the (m+1)-th symbol.

25. A demodulating method of demodulating amplitude-demodulated signals in accordance with claim 24, wherein the step (a) includes the step of obtaining one of the first and second threshold values having a predetermined relationship with the amplitude value of the amplitude component of each symbol of the amplitude-modulated signal in accordance with the demodulated amplitude code of the symbol.

* * * * *

UNITED STATES PATENT AND TRADEMARK OFFICE
CERTIFICATE OF CORRECTION

PATENT NO. : 6,046,629
DATED : April 4, 2000
INVENTOR(S) : AKIYAMA, et al

It is certified that error appears in the above-identified patent and that said Letters Patent is hereby corrected as shown below:

On the title page, left-hand column, after "[73] Assignee: delete "Hitachi, Ltd, Tokyo, Japan" insert --Hitachi Denshi Kabushiki Kaisha and Nippon Hoso Kyokai, both of Tokyo, Japan--

Signed and Sealed this

Eighth Day of May, 2001

*Attest:*

NICHOLAS P. GODICI

*Attesting Officer*   Acting Director of the United States Patent and Trademark Office